(No Model.) 2 Sheets—Sheet 1.
H. FAIRBROTHER.
MACHINE FOR DRESSING SAW TEETH.
No. 313,581. Patented Mar. 10, 1885.
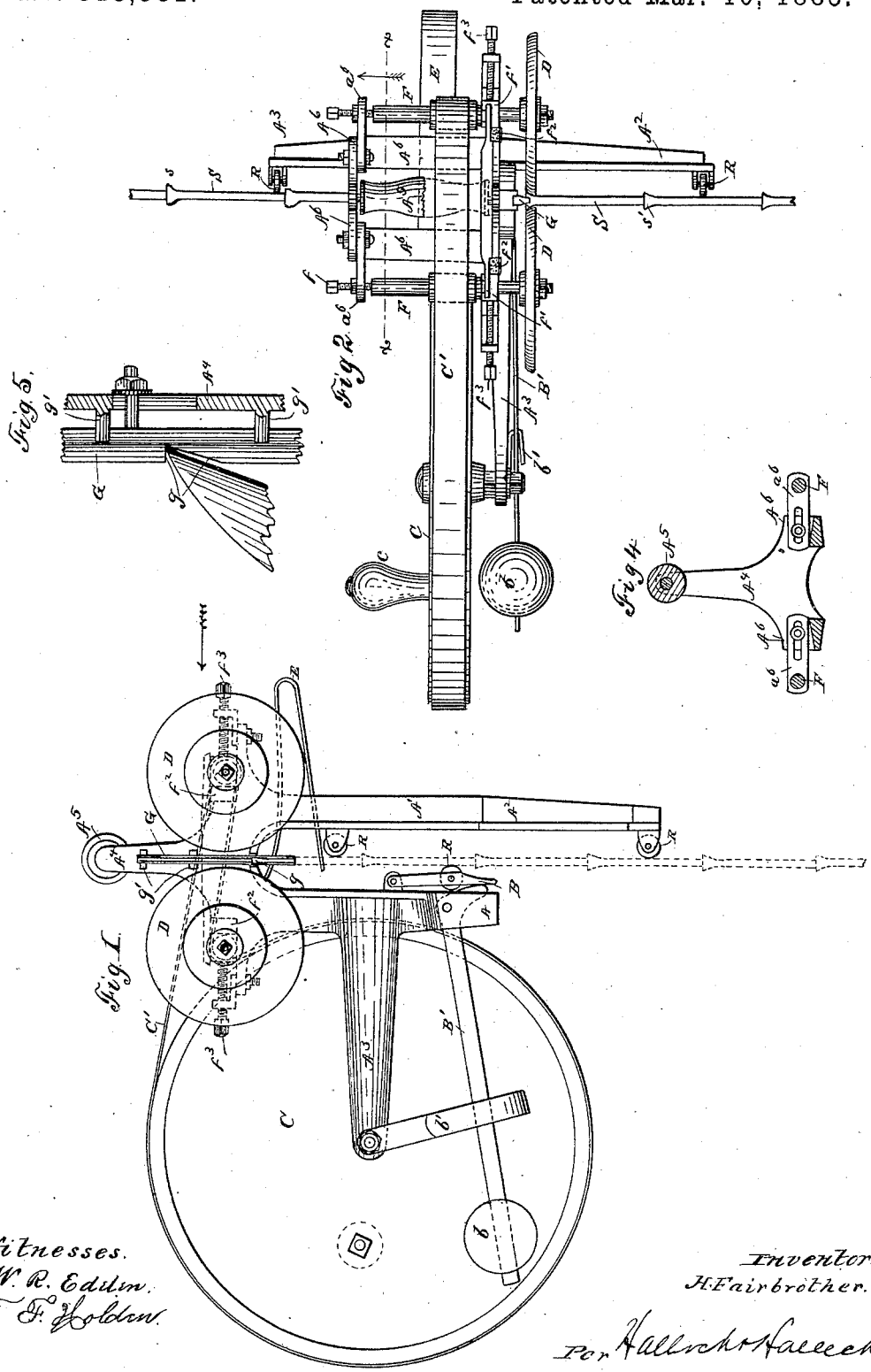
Witnesses.
W. R. Edlin.
J. F. Holden.
Inventor.
H. Fairbrother.
Per Halleck & Halleck
Atts

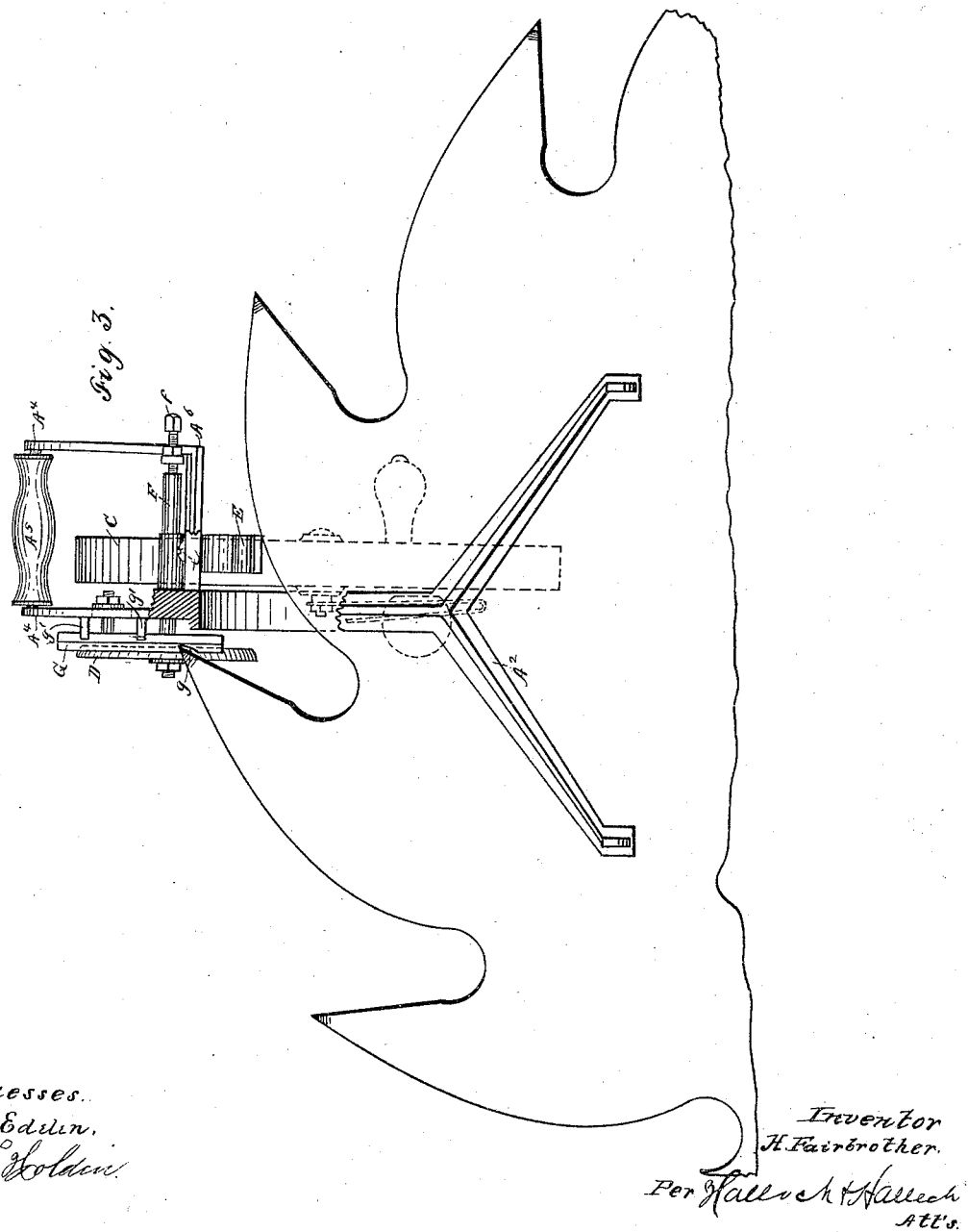

UNITED STATES PATENT OFFICE.

HARLEY FAIRBROTHER, OF CONNEAUT, OHIO.

MACHINE FOR DRESSING SAW-TEETH.

SPECIFICATION forming part of Letters Patent No. 313,581, dated March 10, 1885.

Application filed January 19, 1884. (No model.)

*To all whom it may concern:*

Be it known that I, HARLEY FAIRBROTHER, a citizen of the United States, residing at Conneaut, in the county of Ashtabula and State of Ohio, have invented certain new and useful Improvements in Machines for Dressing Saw-Teeth; and I do hereby declare the following to be a full, clear, and exact description of the invention, such as will enable others skilled in the art to which it appertains to make and use the same.

This invention relates to improvements in machines for dressing saw-teeth, and has for its object the improvement of the construction and operation of the same.

In a former patent, dated April 5, 1881, issued to me I show a machine of the class to which my present invention relates. I have found the construction there shown to be impracticable, while the objects and purposes there sought to be accomplished are most valuable. The construction I now show remedies the defects of the device shown in said patent and fully attains the objects and purposes there sought to be attained, which are as follows: Great care and exactness is required in preparing—that is, setting and dressing—the teeth of saws, and especially of large circular saws, for any material variation in the size and shape of the points of the teeth will cause the saw to run hard in the timber, and will also cause it to swerve from a true course and bind, and injure the lumber. In redressing a saw, the teeth are widened by being upset by a swage and are then dressed to the proper form by hand by filing, or, at least, such was the case prior to my invention of a machine for doing that work. It is impossible for the most skilled dresser to form all the teeth alike, while a machine will necessarily do so if properly constructed and arranged.

The defects of the machine shown in my former patent were as follows: It required too much care and time to properly adjust it upon the saw. It had to be held to its work by the hand of the operator, and hence required great skill to do good work, and so, of course, not serving the purposes a machine should serve.

In the device here shown means are provided for making the machine adjustable upon the saw, also means for properly guiding the dressing-wheels to their work, so that each tooth must be dressed alike by them.

The machine is so supported upon the saw that no skill or care is required and no mistakes can be made.

The machine is so arranged or formed as to be very easily operated, and so that the operator can occupy an easy position and always have full view of his work.

My device is illustrated in the accompanying drawings, as follows: Figure 1 is a side elevation of the machine, and shows the saw in position by dotted lines. Fig. 2 is a top or plan view of the machine in place on the saw. Fig. 4 is a vertical section on the line $x\ x$ in Fig. 2, looking in the direction of the arrow. Fig. 3 is a view, partly in section and partly in elevation, looking in the direction of the arrow in Fig. 1, showing also the position on the saw. Fig. 5 is a detail showing the construction of the gage G.

Letters of reference indicate parts, as follows:

$A\ A'\ A^2\ A^3\ A^4\ A^5\ A^6$ are the various parts of the frame-work. $B\ B'\ b$ represent the clamping device by which the frame is clamped in place upon the saw. C is the drive-wheel; $C'$, the belt; D D, the grinding-wheels which dress the tooth. F F are the spindles of the grinding-wheels. E is a spring attached by one end to cross-piece $A^6$ by means of a bolt, $e$, (see Fig. 3,) which spring forms the support of the machine on the saw. G is the tooth-guide or gage. R R R R are bearing-rollers in the frame, which bear upon the sides of the saw. S is the saw. $s$ is a swaged but undressed tooth, and $s'$ is a dressed tooth.

The frame of the machine supports all its parts. It is of one piece of casting, except the handle $A^5$. The legs A A' of the frame straddle the saw, and the leg A' has two branches, $A^2$, which spread out on the side of the saw, giving a wide bearing. From the leg A is an arm, $A^3$, which supports the driving-wheel C. On the leg A is also hung the clamping device, which consists of a movable or pivoted jaw, B, a cam-lever, B', and weight $b$. In the jaw B is a roller, R, and the leg $A'\ A^2$ is provided with three bearing-rollers, R R R. These rollers make it easy to move the machine up and down while clamped on the saw.

In putting the device in place on the saw the lever B' is raised so as to open the jaw B, and the machine slips easily over the saw until the loose end of the spring E sets on the arch or crown of one of the saw-teeth. The lever B' is then allowed to drop by its weight $b$, and the saw is at once clamped between the bearing-rollers.

I make the drive-wheel C of wood or other light material, so that the machine will not tend to sway or warp the saw by its weight, and also to make the machine as light as possible, and for this latter purpose I make the frame of malleable cast-iron. The head of the frame is composed of the parts $A^6$ $A^4$ and the handle $A^5$, and is of a proper form to receive and support the spindles F F and their bearings. The spindles must be made adjustable from and toward each other, so as to take up the wear of the grinding-wheels, and so as to adjust said wheels to various thicknesses of saws. The back ends of the spindles are journaled on gudgeon-screws $f f$, which are in adjustable arms $a^6 a^6$. (These are seen clearly in Fig. 4.) The forward ends of the spindles are journaled in sliding boxes $f' f'$, which are adjustable by screws $f^3 f^3$ and rubber-block springs $f^2 f^2$. It will at once be seen that by this means the grinding-wheels D D, which are made of emery or any suitable material and are mounted on the ends of the spindles, can be perfectly adjusted to the saw.

In Fig. 2 the position of parts, when the machine is in operation, is clearly shown; and by observing the form of the untrimmed or undressed teeth $s$ on one side and the dressed ones $s'$ on the other side, the manner of working and the character of work of the machine will be clearly understood.

In dressing a tooth the operator pushes or bears down on the machine, so that it moves vertically upon the saw. This movement is permitted by the yielding of the spring E. The result of the action is that the tooth which is to be dressed passes up between the two grinding-wheels and is by them shaped as desired, their cutting-edge being of the proper form to give the tooth its proper form as it passes between them. It now only remains to properly guide the tooth in its passage between the grinding-wheels, so that they will act upon it at exactly the proper distance from the point. This is effected by the tooth gage or guide G, which is attached to the head of the frame-work directly back of the space between the two grinders in guides $g' g'$, and has a free vertical movement, but can have no lateral movement. In the face of this guide-bar G is a notch, $g$, for receiving the tooth-point, and it is of such a depth as to hold the tooth so that the grinders will act upon its sides the proper distance from its point. (In Fig. 2 this is shown by a top view, and in Fig. 5 by a side view.) An arm from the guide G passes through a slot in the frame-work to hold the two together, and also acts to guide the vertical movement of the gage G, and further serves as a stop to limit the amount of said vertical movement, and this is so fixed that as soon as the tooth has passed up above the center of the grinders the movement is stopped.

When the machine is put upon the saw by the operator, he stands directly in front of the saw and grasps the machine by its handle $A^5$ in one hand, leaving the other hand free to turn the drive-wheel. As the machine goes onto the saw it adjusts itself to it by reason of the clamp B B'. The operator sets it so that the spring E rests on the crown of the tooth immediately back of the one to be dressed, and the point of the one to be dressed is placed in the notch $g$ on the gage G. The grinders are then above the tooth to be dressed. The operator then turns the drive-wheel with one hand and bears down on the machine with the other hand, so as to depress the spring E gradually and allow the tooth to pass slowly up between the grinders, the gage-bar G moving up with it until it is stopped, when the tooth passes the center of the grinders. The tooth is then wholly finished and the operator releases his pressure on the machine and the spring throws it up. He then moves the machine to the next tooth. In moving the machine the lever B' should be lifted to release the saw. This can be done by the hand which turned the drive-wheel. The rollers R permit the vertical movement of the machine without difficulty; but in changing from tooth to tooth the saw should be relieved from the pressure. When the pressure which pushes the machine down is exerted, the tendency, by reason of the spring E bearing on the crown of the adjoining tooth, is to keep the point of the tooth being dressed well seated in the notch G. It will therefore be seen that it is impossible for even a careless operator to dress a tooth badly. They must all be dressed alike unless a change is made in the adjustment of the parts of the machine. It will therefore be seen that by my machine skill is unnecessary, and also that the work of dressing a saw can be done very quickly. My machine may be applied to straight reciprocating saws by slight modifications in the frame-work.

What I claim as new is—

1. In a saw-tooth-dressing machine, the combination, substantially as herein shown, of a frame-work adapted to span or straddle the saw, a clamping device thereon for binding or clamping said frame upon the saw, and friction-rollers R, arranged at the places of bearing of said frame and clamp, substantially as shown, and for the purposes set forth.

2. In a saw-tooth-dressing machine, the combination, substantially as shown, of the following elements: a frame-work which spans or straddles the saw, a spring rest or bearing for supporting said frame upon said saw, and a clamping device for binding said frame laterally on said saw.

3. In a saw-tooth-dressing machine, the combination, substantially as shown, of the following elements: a frame-work which spans the saw, a clamping device for binding said frame on said saw, a spring-rest for supporting said frame on the edge of said saw, and finally friction-rollers at the lateral bearing-points of said frame.

4. In a saw-tooth-dressing machine, the combination, substantially as shown, of the following elements: a frame-work which spans or straddles the saw and supports a driving-wheel at right angles to said saw, grinding-wheels mounted on said frame at right angles to said saw and geared to be operated from said driving-wheel, a yielding rest for supporting said frame vertically on the edge of said saw, a clamp for binding said frame against lateral movement on said saw, and finally friction-rollers at the lateral bearing-points of said frame.

5. In a saw-tooth-dressing machine wherein the tooth is dressed by two rotating grinding-wheels set at right angles to the saw, or substantially so, on opposite sides thereof, the combination, with said grinders, of a vertically-movable saw-tooth gage and guide, substantially as shown, and for the purposes mentioned.

6. In a saw-tooth-dressing machine, the combination, substantially as shown, of the supporting-frame, the grinders D D, and the vertically-movable notched guide-bar G, arranged with relation to each other and operating together, substantially as and for the purposes set forth.

7. In a saw-tooth-dressing machine, the combination, substantially as shown, upon a supporting frame-work, of the grinders D D, the spring-support E, and the vertically-movable guide G, for the purposes mentioned.

8. In a saw-tooth-dressing machine, the combination, substantially as shown, of the following elements: a frame-work which spans the saw and supports the grinding-wheels and the necessary gearing for operating the same, a spring support or rest for said frame on the edge of the saw, by which the machine may be given a vertical movement, and finally a vertically-movable saw-tooth guide, substantially as and for the purpose described.

9. In a saw-tooth-dressing machine, the combination, substantially as set forth, of the following elements: a frame-work which spans and clamps the saw, so as to be held against lateral movement, but is free to move vertically, grinding-wheels adjusted on said frame, so as to act against the sides of the saw-teeth, and a vertically-movable guide and gage, substantially as and for the purpose described.

10. In a saw-tooth-dressing machine, the combination of the frame A, A', A$^2$, A$^3$, A$^4$, A$^5$, and A$^6$, the adjustable spindles F F, the grinding-wheels D D, the guide G, the spring E, the clamp B B', the rollers R R R R, the drive-wheel C, and belt C', as shown, and for the purposes set forth.

In testimony whereof I affix my signature in presence of two witnesses.

HARLEY FAIRBROTHER.

Witnesses:
 JNO. K. HALLOCK,
 ROBERT H. PORTER.